United States Patent [19]

Miyata et al.

[11] 4,246,254

[45] Jan. 20, 1981

[54] FIBROUS MAGNESIUM HYDROXIDE AND PROCESS FOR PRODUCTION THEREOF

[75] Inventors: Shigeo Miyata; Akira Okada, both of Takamatsu, Japan

[73] Assignee: Kyowa Chemical Industry Co., Ltd., Tokyo, Japan

[21] Appl. No.: 14,155

[22] Filed: Feb. 22, 1979

[30] Foreign Application Priority Data

Feb. 22, 1978 [JP] Japan .................. 53-18602

[51] Int. Cl.$^3$ .............................................. C01F 5/14
[52] U.S. Cl. .................................. 423/635; 423/636; 423/638; 423/639
[58] Field of Search ............... 423/635, 639, 636, 638

[56] References Cited

U.S. PATENT DOCUMENTS

| 3,711,600 | 1/1973 | Sturm et al. ........................ 423/639 |
| 4,145,404 | 3/1979 | Miyata et al. ........................ 423/639 |

OTHER PUBLICATIONS

Kirk–Othmer, Encyclopedia of Chemical Technology, Second Edition, vol. 12 (1969), pp. 724–726.

*Primary Examiner*—O. R. Vertiz
*Assistant Examiner*—Wayne A. Langel
*Attorney, Agent, or Firm*—Wenderoth, Lind & Ponack

[57] ABSTRACT

Fibrous magnesium hydroxide having a hexagonal needle-like crystal structure. The fibrous magnesium hydroxide can be produced by drying a basic magnesium compound having a needle like crystal structure expressed by the following formula $$Mg(OH)_{2-nx} \cdot A_x^{n-} \cdot mH_2O$$

wherein n is 1 or 2, $A^{n-}$ represents a monovalent or divalent anion, x is $0.2 \leq x \leq 0.5$, and m is $0 < m \leq 2$, under conditions which do not cause a loss of its needle-like crystal form so that a part of the water of crystallization is liberated from the magnesium compound; and contacting the dried magnesium compound with an alkali in a liquid medium which is inert to the magnesium compound and does not dissolve the magnesium compound.

2 Claims, 6 Drawing Figures

Figure 3:
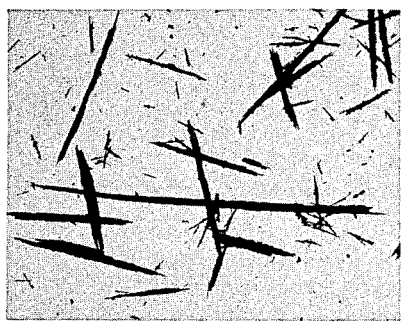

Fig. 3-A'
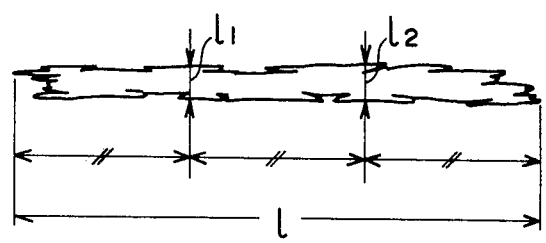

FIBROUS MAGNESIUM HYDROXIDE AND PROCESS FOR PRODUCTION THEREOF

This invention relates to magnesium hydroxide having a hitherto unknown crystal shape, and to a process for producing said magnesium hydroxide. The novel magnesium hydroxide has utility in new fields as well as conventional uses of magnesium hydroxide because of useful characteristics such as its unique and hitherto unknown fibrous shape and its high purity.

More specifically, the invention pertains to fibrous magnesium hydroxide having a hexagonal needle-like crystal structure, and particularly, to fibrous magnesium hydroxide having a length-to-diameter ratio, determined by an electron microscope at a magnification of $1000\times$, of at least about 5, preferably at least about 10.

It is well known that magnesium hydroxide has a hexagonal plate-like crystal structure. The conventional magnesium hydroxide, when viewed under an optical or electron microscope, looks like a hexagonal or rounded hexagonal plate-like crystal, its fragments, or an assembly of these, and the ratio of its maximum length (maximum diameter) to its minimum length (minimum diameter) is less than 5, and usually about 1 to 3.

The present inventors worked on the production of high-purity magnesium hydroxide from basic magnesium compounds, and discovered that there exists fibrous magnesium hydroxide having a hexagonal needle-like crystal structure, and that this novel magnesium hydroxide can be easily produced by a commercially advantageous process.

It has also been found that because of its useful characteristics such as its fibrous shape and high purity, the novel magnesium hydroxide of the invention finds wide application not only in known uses of magnesium hydroxide, but also in the uses of inorganic fibrous materials such as glass fibers or asbestos, and as a raw material for the production of high-purity magnesium oxide and a raw material for the production of light-permeable heat-resistant magnesium oxide.

It is an object of this invention therefore to provide novel fibrous magnesium hydroxide.

Another object of this invention is to provide a process for advantageously producing said fibrous magnesium hydroxide.

The above and other objects and advantages of this invention will become more apparent from the following description.

To facilitate the understanding of the present invention, a conventional magnesium hydroxide having a hexagonal plate-like crystal structure and the fibrous magnesium hydroxide having a hexagonal needle-like crystal structure of this invention are explained below by reference to the accompanying drawings.

Figure 1A:
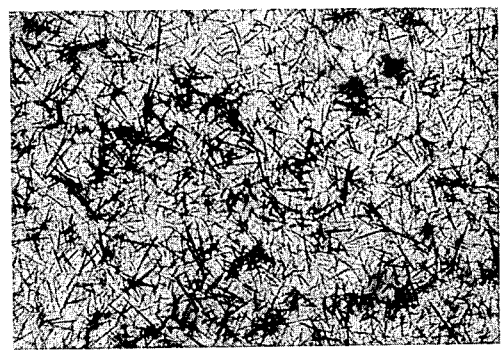
Figure 1B:
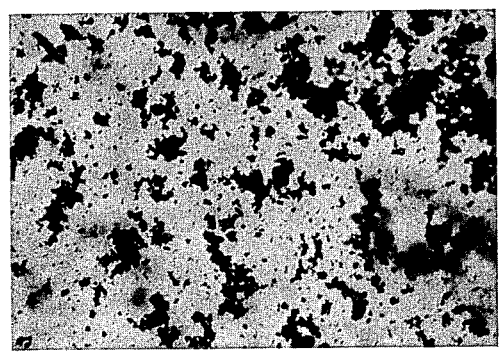

FIG. 1-A is a photograph of one example of the fibrous magnesium hydroxide which was taken under an optical microscope at $150\times$; and FIG. 1-B is a photograph taken similarly of one example of the known magnesium hydroxide having a hexagonal plate-like crystal structure.

Figure 2:
Figure 2:
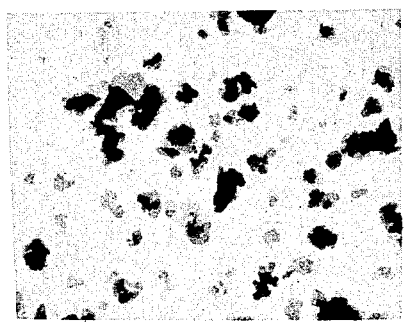

FIG. 2-A is a photograph of one example of the fibrous magnesium hydroxide of this invention which was taken under an electron microscope at $20,000\times$; and FIG. 2-B is a photograph similarly taken of one example of the conventional magnesium hydroxide having a hexagonal plate-like crystal structure.

FIG. 3-A is a photograph of one example of the fibrous magnesium hydroxide which was taken under an electron microscope at $1000\times$.

As can be seen from a comparison of FIG. 1-A with FIG. 1-B, and FIG. 2-A with FIG. 2-B, the magnesium hydroxide of this invention differs from the conventional magnesium hydroxide having a hexagonal plate-like crystal structure in that the former apparently has quite a different fibrous shape or needle-like shape.

The magnesium hydroxide of this invention has a length-to-diameter ratio, determined under an electron microscope at $1000\times$, of at least about 5, usually at least about 10, in many cases about 30 to about 60 or more, as seen from FIG. 3-A, and its fibrous shape can be observed also under an optical microscope. The fibrous magnesium hydroxide of this invention usually has an average diameter of about 0.01 to about 10 microns, and a length of about 5 to about 10,000 microns. Usually, the fibrous magnesium hydroxide is very highly pure, and for example, contains not more than 0.02% of CaO and not more than 0.05% of Cl.

The length-to-diameter ratio of the magnesium hydroxide of this invention determined under an electron microscope at $1,000\times$ is obtained by approximately equally dividing one fibrous crystal shown in the photograph of FIG. 3-A along its length into three sections, measuring its diameters crossing the two equally dividing points at right angles to its length, arithmetically averaging the two measured diameters, and dividing the length of the crystal by the average diameter calculated. For example, in a model drawing of a fibrous crystal shown in FIG. 3-A', the length-to-diameter ratio of the crystal is given by $$l / \frac{l_1 + l_2}{2}.$$

The fibrous magnesium hydroxide of this invention can be prepared by contacting a basic magnesium compound having a needle-like crystal structure expressed, for example, by the following formula $$Mg(OH)_{2-nx} \cdot A_x{}^{n-} \cdot mH_2O \tag{1}$$

wherein $A^{n-}$ represents a monovalent or divalent anion (n=1 or 2), x is $0.2 \leq x \leq 0.5$, and m is $0 < m \leq 2$, with an alkali in a liquid medium under conditions which do not cause a loss of its needle-like crystal form, said liquid medium being inert to the basic magnesium compound and incapable of substantially dissolving the basic magnesium compound.

Specific examples of the anion $A^{n-}$ of the basic magnesium compound as a starting material are $Cl^-$, $Br^-$, $NO_3^-$ or $SO_4{}^{2-}$. Examples of the basic magnesium compound having a needle-like crystal structure used in the production of the fibrous magnesium hydroxide of this invention are the following compounds described in the X-ray powder data file of ASTM.

(ASTM No. 7-403)  $Mg_2(OH)_3Cl \cdot 3H_2O$: $Mg(OH)_{1.5}Cl_{0.5} \cdot 1.5H_2O$
(ASTM No. 7-409)  $Mg_{10}(OH)_{18}Cl_2 \cdot 5H_2O$: $Mg(OH)_{1.8}Cl_{0.2} \cdot 0.5H_2O$
(ASTM No. 7-412)  $Mg_2(OH)_3Cl \cdot 4H_2O$: $Mg(OH)_{1.5}Cl_{0.5} \cdot 2H_2O$ (ASTM No. 7-411) $Mg_2(OH)_3Br.4H_2O$: $Mg(OH)_{1.5}Br_{0.5}.2H_2O$
(ASTM No. 7-415) $Mg_6(OH)_{10}SO_4.3H_2O$: $Mg(OH)_{5/3}(SO_4)_{1/6}.0.5H_2O$
(ASTM No. 7-416) $Mg_3(OH)_5Cl.3H_2O$: $Mg(OH)_{5/3}Cl_{1/3}.H_2O$
(ASTM No. 7-419) $Mg_2(OH)_3Cl.2H_2O$: $Mg(OH)_{3/2}Cl_{1/2}.H_2O$
(ASTM No. 7-420) $Mg_3(OH)_5Cl.4H_2O$: $Mg(OH)_{5/3}Cl_{1/3}.4/3H_2O$ When prior to contacting with the alkali, the basic magnesium compound is dried under conditions which do not cause a loss of its needle-like crystal form so that a part of the water of crystallization of the compound is liberated, the yield of the fibrous magnesium hydroxide further increases, the fibrous magnesium hydroxide can be obtained with good reproducibility, and moreover, the operation becomes easy. Hence, this is an especially preferred embodiment of the process of this invention. If the water of crystallization is completely liberated, it is practically impossible to form the desired fibrous magnesium hydroxide. It is recommended that the starting basic magnesium compound be dried to such an extent that only a part of the water of crystallization is liberated without a loss of its needle-like crystal structure, thus moderately destroying the crystals of the basic magnesium compound.

The drying conditions can be properly selected depending upon the type of the starting basic magnesium compound, the drying means, etc. For example, by drying the basic magnesium compound at about 50° to 200° C., in most cases about 50° to about 150° C. for several hours, a part of the water of crystallization can be liberated. Usually, the drying treatment is carried out under atmospheric pressure. But if desired, reduced pressures may be employed. Any desired means of drying can be employed which can dry the basic magnesium compound to such an extent that a part of the water of crystallization is liberated but the needle-like crystal structure of the magnesium compound is not lost. Any known means such as hot air drying, vacuum drying, kiln drying, spray drying or fluidized bed drying can be used.

The dried compound is then contacted with an alkali in a liquid medium which is inert to the magnesium compound (does not chemically react with the magnesium compound) and does not substantially dissolve the magnesium compound. Thus, it can be converted to the desired fibrous magnesium hydroxide. Examples of the liquid medium are water, ketones such as acetone, and lower alcohols such as methanol and ethanol. These are used either singly or as a mixture of two or more.

The aforesaid treatment can be easily performed by contacting a suspension of the dried basic magnesium compound with alkali in the liquid medium. For example, the dried magnesium compound may be suspended in the liquid medium to which the alkali has been added previously, or both the dried magnesium compound and the alkali may be added simultaneously to the liquid medium. Alternatively, the dried magnesium compound may be added to the liquid medium, and then the alkali, added to the resulting suspension.

Suitable alkalies used for this purpose include inorganic alkalies, for example alkali metal hydroxides such as sodium hydroxide and potassium hydroxide, ammonia, calcium hydroxide and ammonium hydroxide. The amount of the alkali can be properly chose, but preferably, it is used in an amount corresponding to about 1 to about 2 equivalents per equivalent of the anion $A^{n-}$ of the basic magnesium compound of formula (1) having a needle-like crystal structure. By this treatment with the alkali, the anion $A^{n-}$ of the compound (1) is replaced by $OH^-$ to convert it to fibrous magnesium hydroxide. The reaction proceeds at room temperature, but elevated temperatures of at least about 60° C. are preferred. For Example, the reaction temperature is about 60° to about 150° C. If the treatment is carried out at at least about 60° C., the yield of the fibrous magnesium hydroxide increases very much. The reaction can be completed in about 1 to about 20 hours. The resultant fibrous magnesium hydroxide can be identified by X-ray diffraction.

The basic magnesium compound of formula (1) having a needle-like crystal structure can be prepared, for example, by reacting a water-soluble magnesium compound such as a halogen compound of magnesium or a magnesium salt of an inorganic or organic acid with an alkaline substance, preferably a weakly alkaline substance, in an aqueous medium.

Examples of the magnesium compound include magnesium chloride, magnesium bromide, magnesium iodide, magnesium nitrate, magnesium sulfate, brine, ionic bittern (the solution remaining after the concentration of sodium chloride from sea water by an ion-exchange membrane), and magnesium acetate. Suitable alkaline substances include ammonia, ammonium hydroxide, slaked lime, magnesium oxide, sodium hydroxide, and potassium hydroxide. Weakly alkaline substances such as ammonia, ammonium hydroxide, magnesium oxide and slaked lime are preferred. The concentration of the aqueous solution of the magnesium compound is preferably at least about 30 g/l (aqueous medium), more preferably at least about 50 g/l (aqueous medium), calculated as MgO. The higher the concentration, the easier the formation of the basic magnesium compound having a needle-like crystal structure.

Since the reaction between the magnesium compound and the alkaline substance proceeds at room temperature, it is not particularly necessary to cool or heat the reactant mixture. If desired, however, such cooling or heating conditions may be used. For example, the reaction temperature is about 0° C. to about 250° C. Hydrothermal treatment at about 100° to about 250° C. for several hours can induce further growth of needle-like crystals. The needle-like crystals of the starting basic magnesium compound can be further grown by aging the reaction mixture at about 0° to about 150° C., preferably at about 40° to about 100° C., without stirring, and this frequently gives better results. The amount of the alkaline substance can be properly chosen, and for example, it is about 0.05 to 0.5 equivalent based on the magnesium compound.

One example of the preparation of the starting basic magnesium compound is specifically described below. A basic magnesium compound having a needle-like crystal structure expressed by the formula $Mg_3(OH)_5Cl.4H_2O$ can be prepared, for example, by adding about 0.1 o 0.3 equivalent of an alkaline substance such as slaked lime to an aqueous solution containing magnesium chloride, and allowing the mixture to stand at room temperature for several hours, to precipitate needle-like crystals having the above formula. Preferably, the needle-like crystals so precipitated can be further grown by aging the reaction mixture at about 60° to 100° C. for several hours to several months. The needle-like crystals can further be grown by hydrothermally treating the reaction product in the mother liquor for several hours at a temperature of at least about 150° C., for example, about 105° to about 150° C. Use of the basic magnesium compound having a fully grown needle-like crystal structure serves to increase the yield of the fibrous magnesium hydroxide of this invention, and gives fibrous crystals of magnesium hydroxide having a higher length-to-diameter ratio. Hence, this frequently gives better results.

The fibrous magnesium hydroxide of this invention is useful in all fields in which the conventional magnesium hydroxide having a hexagonal plate-like crystal structure has found applications, and also had unique and high utilitarian values in a wide range of other fields which utilize its superior characteristics including its fibrous shape and high purity. For example, it exhibits an effect of modifying the mechanical properties of thermoplastic and thermosetting resins when used as an inorganic fibrous filler for these resins in addition to the known utility as a fire retardant for these resins. Thus, the fibrous magnesium hydroxide has not only a fire retarding effect but also an effect of increasing tensile strength, flexural strength, and flexural modulus. For example, it can play a role of the reinforcing agent, such as glass fibers, in fiber-reinforced plastics. The fibrous magnesium hydroxide of this invention can also be used as an antacid, and an adsorbent for acids and anions, and is also useful in the field of electrical materials, particularly electrical insulating materials or filter materials, and abrasive reinforcing strengthening material, as a filler or press-formed product. It can be used also as a thermally insulating material in buildings, refrigerating machines, heaters, and industrial devices. Its unique characteristics are also expected to be utilized in a wide range of other fields including sound-absorbing and sound-shielding materials, corrosion-resistant materials, roofing materials, concrete filler, and thermally insulating or heat-resistant cloths or sheet materials. Its high purity makes it useful also as a raw material for high-purity magnesium oxide and light-permeable heat-resistant magnesium oxide. Still other applications include a thickner for unsaturated polyesters, a heavy oil additive, a carrier for a Ziegler catalyst for polyolefin production, a raw material for magnesium carbonate, an acid neutralizing agent, an agent for refining sugar, a raw material for metallic magnesium, a raw material for a bittern fertilizer, and a raw material for refractory bricks.

The following Examples illustrate the fibrous magnesium hydroxide of this invention and its production in more detail.

EXAMPLE 1

To 10 liters of ionic bittern ($MgCl_2$ solution) containing 64.4 g/liter (1.598 moles/liter) as MgO was added 118.2 g (corresponding to 0.1 equivalent per equivalent of $MgCl_2$) of powdery slaked lime over the course of about 4 minutes at about 15° C. The mixture was stirred for about 10 minutes. Calcium carbonate formed as an impurity was removed by filtration. The recovered mother liquor was allowed to stand at about 20° C. for 18 hours. To grow the precipitated needle-like crystals, the product was heated to 80° C., and aged at this temperature for about 30 minutes. The resulting crystals were further aged at 120° C. for 2 hours in an autoclave while it was still held in the mother liquor to obtain fully grown needle-like crystals. Observation by an optical microscope showed that the diameter (short axis) of the needle-like crystals was about 0.1 to 0.5 micron, and the length (long axis) thereof was about 50 to 80 microns. The crystals were washed with water and then with acetone, and dried at room temperature. The product was identified as $Mg_3(OH)_5Cl.4H_2O$ by X-ray diffraction analysis.

The basic magnesium compound having a needle-like crystal structure obtained by the procedure set forth above was washed with water, dehydrated, and dried at about 85° C. for about 4 hours. X-ray diffraction of the dried product showed that about a half of the structure of $Mg_3(OH)_5Cl.4H_2O$ was destroyed, and a new diffraction pattern was noted. About a half of the water of crystallization disappeared also. It is though that the structure of the needle-like crystals of this compound somewhat changed by the treatment of partially removing the water of crystallization, and approached the structure of hexagonal system magnesium hydroxide. Ten grams of the needle-like crystals having their structure partly changed was put into 500 ml of water, and 40 ml of an aqueous solution of sodium hydroxide (1mole/liter) was added to the mixture. The resultant mixture was allowed to stand at about 21° C. for about 2 days at a pH of 13.3. The resultant fibrous product was washed with water, and dried. This product was determined to be magnesium hydroxide as a result of its X-ray diffraction analysis. While the starting $Mg_3(OH)_5Cl.4H_2O$ had a Cl content of 12.9%, the resulting fibrous magnesium hydroxide had a Cl content of 0.05%, and a CaO content of 0.02%. The product had a length-to-diameter ratio, as determined under an electron microscope at 1,000×, of from 15 to 40.

EXAMPLE 2

In the procedure of Example 1, after adding slaked lime, the mixture was aged at 80° C. for 20 days, washed with water, and dried. The resulting needle-like crystals of basic magnesium compound had a diameter of about 0.3 micron to 0.4 micron and a length of about 1 mm to about 2 mm. Subsequently, the same operation as in Example 1 was performed. The product was identified as magnesium hydroxide by X-ray difraction analysis, and was determined to be in the form of needle-like crystals by examination with an optical microscope. The length-to-diameter ratio of the product was from 16 to 60.

EXAMPLE 3

458.4 g of magnesium sulfate ($MgSO_4.7H_2O$) and 50 g of sodium sulfate ($Na_2SO_4.10HD_2O$) were added to 1 liter of water to form a complete solution. While stirring the resulting aqueous solution at about 20° C., 4 g of magnesium oxide was added to it. The amount of the alkali added at this time corresponded to 0.05 equivalent ($MgO/MgSO_4$ mole ratio=0.05). The mixture was heated to about 90° C., then allowed to cool to 40° C., and aged for 24 hours at 40° C.

As a result, a basic magnesium compound in the form of needle-like crystals having a diameter of about 0.2 micron and a length of about 70 microns was obtained. The product was filtered and washed with water. After washing, 6 g of the needle-like crystals were suspended in about 500 ml of water. Then, 66 L ml of 1 mole/l sodium hydroxide (corresponding to 2.5 equivalent based on $SO_4$) was added, and the mixture was stirred at about 25° C. for 12 hours. The product was filtered, washed with water, dehydrated, and dried at 80° C. for 15 hours. By X-ray diffraction analysis, the resulting product was identified as magnesium hydroxide. It contained only 0.06% of $SO_4$ as an impurity. Observation of the product with an optical microscope showed that it consisted mostly of needle-like crystals having a length-to-diameter ratio of from about 200 to about 300.

EXAMPLE 4

477 g of magnesium nitrate [$Mg(NO_3)_2.6H_2O$] and 142 g of calcium nitrate [$Ca(NO_3)_2.4H_2O$] were dissolved in 1 liter of water. Magnesium oxide (4 g) was added to the aqueous solution, and with stirring, the mixture was heated to 90° C. Then, the mixture was allowed to cool to 40° C., and aged for 24 hours at 40° C. to grow needle-like crystals. The amount of the alkali added at this time corresponded to 0.05 equivalent [$Mg(NO_3)_2/MgO$ mole ratio=0.05]. The product was washed with water, and dehydrated. The needle-like crystals of basic magnesium compound (5.5 g) were again put into 500 ml of warm water kept at 90° C., and the mixture stirred.

About 70% of the basic magnesium nitrate obtained by the above procedure consisted of small needle-like crystals. To the suspension was added 20 ml of 1 mole/l sodium hydroxide (corresponding to 1.1 equivalents of $NO_3$), and the mixture was stirred at about 90° C. for about 20 minutes. The mixture was then allowed to cool to about 20° C., washed with water, dehydrated, and dried. By X-ray diffraction analysis, the dried product was identified as magnesium hydroxide. About 60% of the resulting magnesium hydroxide consisted of needle-like crystals having a length-to-diameter ratio of from about 20 to about 30. The impurities contained in the magnesium hydroxide were less than 0.001% of CaO and less than 0.009% of $NO_3$.

What we claim is:

1. A magnesium hydroxide having a hexagonal needle-like crystal structure and having a length-to-diameter ratio, determined by an electron microscope at a magnification of 1,000×, of at least about 10.

2. A process for producing a magnesium hydroxide having a hexagonal needle-like crystal structure, which comprises drying a basic magnesium compound having a needle-like crystal structure expressed by the following formula $$Mg(OH)_{2-nx}.A_x^{n-}.mH_2O$$

wherein n is 1 or 2, $A^{n-}$ represents a monovalent or divalent anion selected from the group consisting of $Cl^-$, $Br^-$, $NO_3^-$ and $SO_4^{--}$, x is $0.2 \leq x \leq 0.5$, and m is $0 < m \leq 2$ under conditions which do not cause a loss of its needle-like crystal form so that a part of the water of crystallization is liberated from the magnesium compound; and contacting the dried magnesium compound with an alkali selected from the group consisting of alkali metal hydroxides, ammonia, calcium hydroxide and ammonium hydroxide in an inert liquid medium selected from the group consisting of water, acetone and lower alcohols.

* * * * *